United States Patent
Hsueh et al.

(10) Patent No.: US 10,444,872 B2
(45) Date of Patent: Oct. 15, 2019

(54) MOUSE WITH ELECTROMAGNETIC MODULE

(71) Applicant: Primax Electronics Ltd., Taipei (TW)

(72) Inventors: Tsung-Wen Hsueh, Taipei (TW); Chun-Nan Su, Taipei (TW); Chun-Che Wu, Taipei (TW)

(73) Assignee: PRIMAX ELECTRONICS LTD, Taipei (TW)

( * ) Notice: Subject to any disclaimer, the term of this patent is extended or adjusted under 35 U.S.C. 154(b) by 8 days.

(21) Appl. No.: 15/879,144

(22) Filed: Jan. 24, 2018

(65) Prior Publication Data

US 2019/0121452 A1 Apr. 25, 2019

(30) Foreign Application Priority Data

Oct. 20, 2017 (TW) .............................. 106136200 A

(51) Int. Cl.
*G06F 3/0362* (2013.01)
*G06F 3/0354* (2013.01)

(52) U.S. Cl.
CPC ........ *G06F 3/0362* (2013.01); *G06F 3/03543* (2013.01)

(58) Field of Classification Search
CPC .................................................... G06F 3/0362
See application file for complete search history.

(56) References Cited

U.S. PATENT DOCUMENTS

| 2007/0146324 A1* | 6/2007 | Blandin | ................ | G06F 3/0362 345/163 |
| 2007/0188453 A1* | 8/2007 | O'Sullivan | ........... | G06F 3/0312 345/163 |

* cited by examiner

*Primary Examiner* — Kent W Chang
(74) *Attorney, Agent, or Firm* — Kirton McConkie; Evan R. Witt

(57) ABSTRACT

The present invention provides a mouse with an electromagnetic module, including: a mouse body, a scroll wheel and an electromagnetic module. The scroll wheel is mounted in the mouse body, and the scroll wheel is provided with a mounting area. The electromagnetic module is mounted in the mouse body. The electromagnetic module includes: a metal inner ratchet, a connecting piece, an electromagnet, and a control element. The metal inner ratchet is fastened in the mounting area. The connecting piece includes a connecting section and a free section. The connecting section is connected to the mouse body, and the free section passes through the mounting area. The electromagnet is mounted on the free section. The control element is electrically connected to the electromagnet. In this way, an effect of continuous-ratcheting is achieved.

7 Claims, 3 Drawing Sheets

MOUSE WITH ELECTROMAGNETIC MODULE

FIELD OF THE INVENTION

The present invention relates to a mouse with an electromagnetic module.

BACKGROUND OF THE INVENTION

At present, mouse devices are 3C products that are usually used at home or at work. Mouse devices need to be used to assist operations when playing standalone games or online games by using computers, when editing files or drawing at work by using computers, and so on. Therefore, mouse devices are indispensable products in people's daily life.

A conventional mouse mainly includes a mouse body, a scroll wheel, a connecting shaft, and an encoder. The scroll wheel is mounted in the mouse body. The connecting shaft passes through and is connected to the scroll wheel, and two ends of the connecting shaft are both pivotally connected to the mouse body. The encoder is located on a side of the scroll wheel and is connected to the scroll wheel. When a user scrolls the scroll wheel, the scroll wheel can drive the encoder, so as to drag content on a display screen.

However, the scroll wheel of the conventional mouse causes uncomfortable hand feels in use when scrolled, and positioning by scrolling is inaccurate. Therefore, when drawing or playing games, the conventional mouse is incapable of implementing accurate positioning by using the scroll wheel. Consequently, the conventional mouse easily causes inconvenience to users in use.

SUMMARY OF THE INVENTION

A main objective of the present invention is to provide a mouse with an electromagnetic module.

In a preferred embodiment, the present invention provides a mouse with an electromagnetic module, including: a mouse body, a scroll wheel, and an electromagnetic module. The scroll wheel is mounted in the mouse body. A side of the scroll wheel is provided with a mounting area. The electromagnetic module is mounted in the mouse body. The electromagnetic module includes: a metal inner ratchet, a connecting piece, an electromagnet, and a control element. The metal inner ratchet is mounted and fastened in the mounting area. The connecting piece is located on the side of the scroll wheel on which the mounting area is provided. The connecting piece includes a connecting section and a free section. The connecting section is connected to the mouse body. The free section passes through the mounting area. The electromagnet is mounted on the free section and is arranged corresponding to the metal inner ratchet. The control element is electrically connected to the electromagnet. The control element drives the electromagnet to generate a magnetic field, so that the electromagnet generates a magnetic attraction force to the metal inner ratchet, and the electromagnet and the metal inner ratchet can engage with each other. In this way, an effect of continuous-ratcheting can be achieved when the scroll wheel is scrolled.

Preferably, the mouse body further includes: an upper casing, a lower casing and a pair of supports, the upper casing correspondingly covers the lower casing and an accommodating space is formed between the upper casing and the lower casing, the scroll wheel, the electromagnetic module and the pair of supports are mounted in the accommodating space, the bottom of each of the pair of supports is fastened to the lower casing, and the scroll wheel is located between the pair of supports and two sides of the scroll wheel are respectively pivotally connected to the supports. Preferably, the connecting section is connected to the support located on the side of the scroll wheel on which the mounting area is provided, and the free section extends out of the connecting section. Preferably, the mouse body further includes a connecting shaft, and the connecting shaft passes through and is connected to the scroll wheel and two sides of the connecting shaft are respectively pivotally connected to the supports, so that the scroll wheel is pivotally connected to the pair of supports by using the connecting shaft.

Preferably, the mouse body further includes an encoding element, the electromagnetic module further includes a rotational speed sensing element, the encoding element is located on a side of the scroll wheel away from the mounting area, the encoding element is connected to the connecting shaft, and the rotational speed sensing element is mounted below the encoding element and is electrically connected to the control element. Preferably, the electromagnetic module further includes a pair of magnetic elements, the pair of magnetic elements are respectively mounted on two sides of the encoding element and are arranged in a symmetric layout, and the rotational speed sensing element can detect positions of the pair of magnetic elements rotating with the encoding element, to generate a rotational speed signal. Preferably, the rotational speed sensing element is a Hall effect sensor, the magnetic element is a magnet, the control element is a microcontroller, and the encoding element is an encoder. In this way, an effect of switching between a ratcheting scroll mode and a free-spinning scroll mode can be achieved according to different spinning speeds of the scroll wheel.

Preferably, the mouse body further includes a main circuit board, the main circuit board is mounted to the lower casing and is located in the accommodating space, and the control element and the rotational speed sensing element are both mounted on the main circuit board and are electrically connected to the main circuit board. Preferably, the connecting piece is a circuit board, the connecting piece is electrically connected to the main circuit board, and the electromagnet is electrically connected to the connecting piece, so that the electromagnet is electrically connected to the control element by using the connecting piece and the main circuit board.

Preferably, central axes of the scroll wheel, the mounting area, the metal inner ratchet, the connecting shaft, and the encoding element are a same central axis. In this way, when the scroll wheel is scrolled, no misalignment occurs, increasing the service life of the mouse.

Preferably, the metal inner ratchet is an element made of a metal material containing a magnetic substance such as iron, cobalt, or nickel. In this way, scrolling time of the scroll wheel is prolonged.

DETAILED DESCRIPTION OF THE PREFERRED EMBODIMENT

Figure 1:
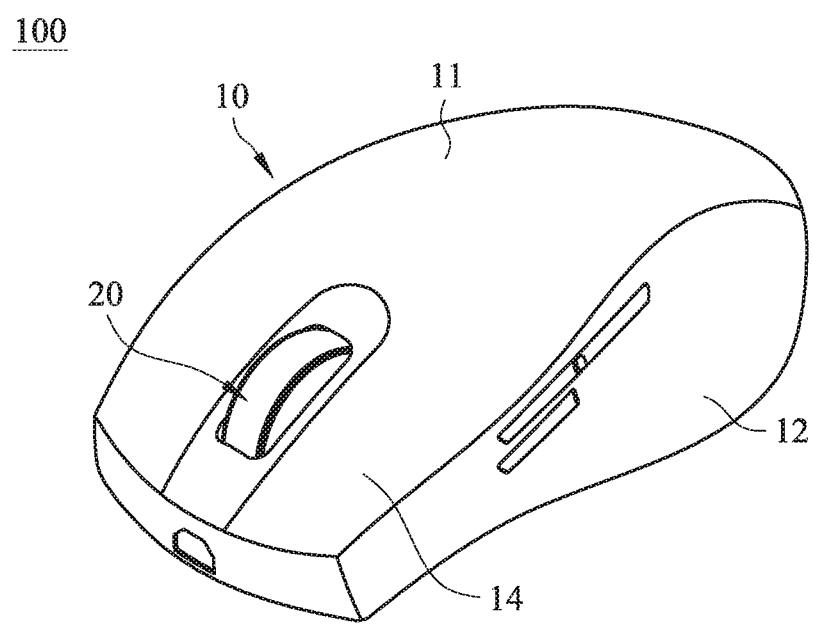
FIG. 1 is a three-dimensional diagram of a mouse with an electromagnetic module according to the present invention.
Figure 2:
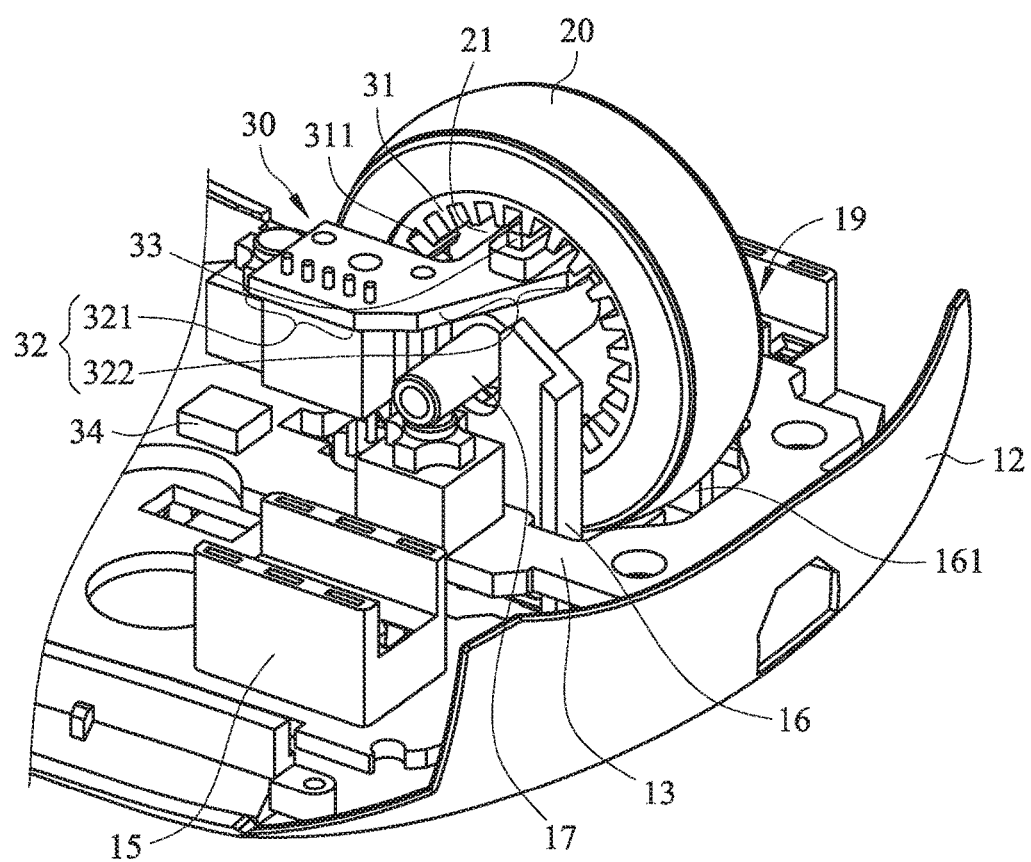
FIG. 2 is a schematic diagram 1 of a mouse with an electromagnetic module according to the present invention.
Figure 3:
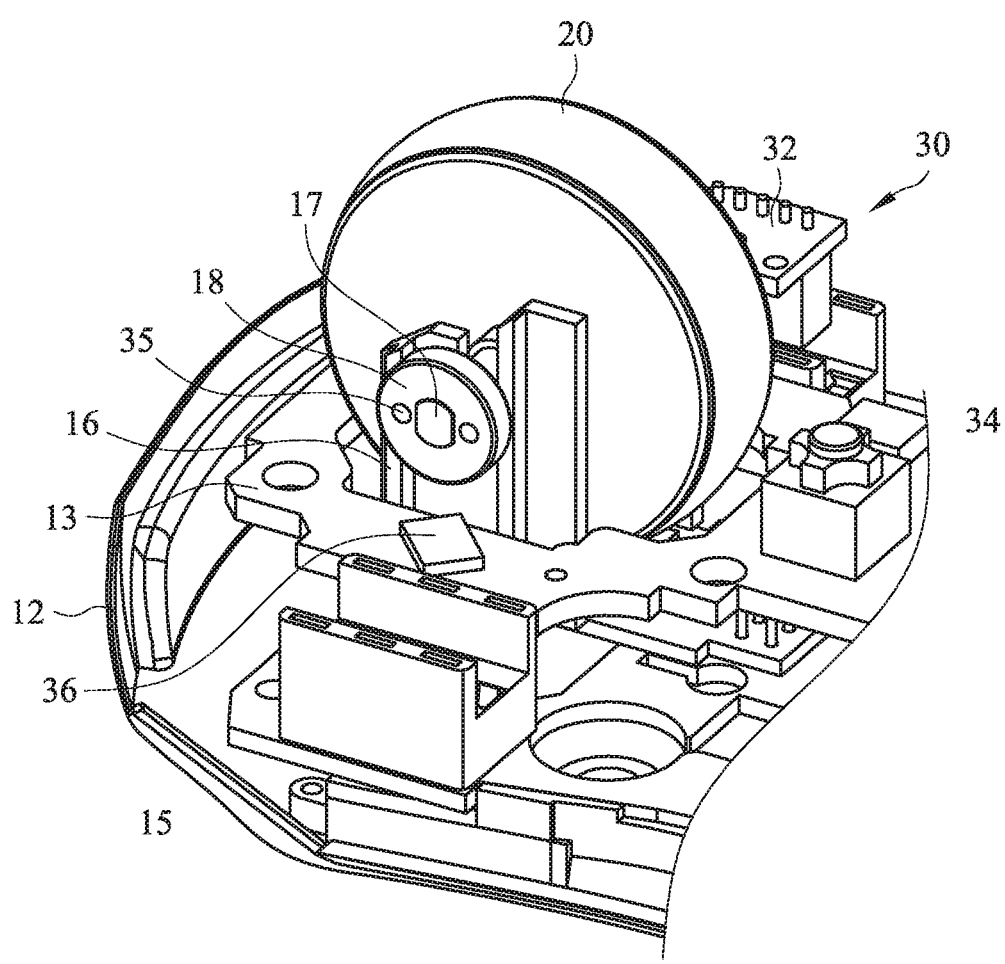
FIG. 3 is a schematic diagram 2 of a mouse with an electromagnetic module according to the present invention.

Referring to FIG. 1 to FIG. 3, FIG. 1 to FIG. 3 are a three-dimensional diagram, a schematic diagram 1, and a schematic diagram 2 of a mouse with an electromagnetic module according to the present invention. The mouse 100 with an electromagnetic module includes: a mouse body 10, a scroll wheel 20, and an electromagnetic module 30.

The mouse body 10 includes: an upper casing 11, a lower casing 12, a main circuit board 13, a pair of buttons 14, a pair of button sensing elements 15, a pair of supports 16, a connecting shaft 17, and an encoding element 18. The upper casing 11 correspondingly covers the lower casing 12, and an accommodating space 19 is formed between the upper casing 11 and the lower casing 12. The main circuit board 13 is mounted in the accommodating space 19 and is fastened to the lower casing 12. The pair of buttons 14 are both disposed on the upper casing 11. The pair of button sensing elements 15 are both disposed in the accommodating space 19, and the pair of button sensing elements 15 are both fastened to the main circuit board 13 and electrically connected to the main circuit board 13. Each button 14 can also be arranged corresponding to a button sensing element 15 by means of optical sensing. The pair of supports 16 are mounted in the accommodating space 19, the bottom of each support is fastened to the lower casing 12, and a separation space 161 is formed between the pair of supports 16.

The scroll wheel 20 is mounted in the accommodating space 19 of the mouse body 10 and is located in the separation space 161 formed by the pair of supports 16, so that the scroll wheel 20 is mounted between the pair of supports 16. A mounting area 21 is provided in the scroll wheel 20. The connecting shaft 17 passes through and is connected to the scroll wheel 20 and two sides of the connecting shaft 17 are respectively pivotally connected to the supports 16, so that the scroll wheel 20 is pivotally connected to the pair of supports 16 by using the connecting shaft 17. The encoding element 18 is located on a side of the scroll wheel 20 away from the mounting area 21, the encoding element 18 is connected to the connecting shaft 17, and the encoding element 18 is an encoder.

The electromagnetic module 30 is mounted in the accommodating space 19 of the mouse body 10. The electromagnetic module 30 includes: a metal inner ratchet 31, a connecting piece 32, an electromagnet 33, a control element 34, a pair of magnetic elements 35, and a rotational speed sensing element 36.

The metal inner ratchet 31 is mounted and fastened in the mounting area 21 of the scroll wheel 20. The metal inner ratchet 31 includes a plurality of ratchet teeth 311 arranged at an equal spacing. A gap is formed between every adjacent ratchet teeth 311. The metal inner ratchet 31 is an element made of a metal material containing a magnetic substance such as iron, cobalt, or nickel. Central axes of the scroll wheel 20, the mounting area 21, the metal inner ratchet 31, the connecting shaft 17, and the encoding element 18 are a same central axis.

The connecting piece 32 includes a connecting section 321 and a free section 322 that extends out of the connecting section 321. The connecting piece 32 is located on a side of the scroll wheel 20 on which the mounting area 21 is provided. The connecting section 321 is connected to the support 16 located on the side of the scroll wheel 20 on which the mounting area 21 is provided. The free section 322 passes through the mounting area 21 of the scroll wheel 20 and is arranged corresponding to the metal inner ratchet 31. The connecting piece 32 is a circuit board, and the connecting piece 32 is electrically connected to the main circuit board 13.

The electromagnet 33 is mounted on a side of the free section 322 adjacent to the scroll wheel 20. The electromagnet 33 is electrically connected to the connecting piece 32. When the electromagnet 33 is powered on, the electromagnet 33 can generate a magnetic field, so that the electromagnet 33 and the metal inner ratchet 31 can engage with each other.

The control element 34 is mounted on the main circuit board 13 and is electrically connected to both the connecting piece 32 and the main circuit board 13, so that the electromagnet 33 is electrically connected to the control element 34 by using the connecting piece 32 and the main circuit board 13. Therefore, the control element 34 transmits electric power to the electromagnet 33 to drive the electromagnet 33 to generate the magnetic field, so that the electromagnet 33 generates a magnetic attraction force to the metal inner ratchet 31, and the electromagnet 33 and the ratchet teeth 311 of the metal inner ratchet 31 can engage with each other.

Each magnetic element 35 is a magnet. The pair of magnetic elements 35 are respectively mounted on two sides of the encoding element 18 and are arranged in a symmetric layout, so that the pair of magnetic elements 35 can rotate with the encoding element 18.

The rotational speed sensing element 36 is mounted below the encoding element 18 and is electrically connected to the main circuit board 13, so that the rotational speed sensing element 36 is electrically connected to the control element 34 by using the main circuit board 13. The rotational speed sensing element 36 can detect positions of the pair of magnetic elements 35 rotating with the encoding element 18, to generate a rotational speed signal, and then the rotational speed sensing element 36 can transmit the rotational speed signal to the control element 34.

When a user scrolls the scroll wheel 20, the scroll wheel 20 drives the encoding element 18 to rotate, so that each magnetic element 35 mounted on the encoding element 18 rotates with the encoding element 18 and the scroll wheel 20. In addition, the rotational speed signal including spinning speed information of the scroll wheel 20 is generated by the rotational speed sensing element 36 located below the encoding element 18 by detecting the positions of the magnetic elements 35, and then the rotational speed sensing element 36 transmits the rotational speed signal to the control element 34. After the control element 34 receives the rotational speed signal, the control element 34 transmits the electric power to the electromagnet 33, so that the electromagnet 33 generates the magnetic field and generates the magnetic attraction force to the metal inner ratchet 31.

However, the electromagnet 33 is mounted on the free section 322 of the connecting piece 32. Therefore, when the electromagnet 33 generates the magnetic attraction force to the metal inner ratchet 31, the electromagnet 33 drives the free section 322 to move to a ratchet tooth closest to the metal inner ratchet 31 or the gap between the ratchet teeth 311. The electromagnet 33 and the ratchet teeth 311 of the metal inner ratchet 31 engage with each other, so that when the scroll wheel 20 rotates, the electromagnet 33 can slide along a tooth flank of each ratchet tooth 311 of the metal inner ratchet 31. When the tooth flank of a ratchet tooth 311 abuts against the electromagnet 33, the free section 322 of the connecting piece 32 is driven to move downward. When the scroll wheel 20 rotates in such a manner that the electromagnet 33 is located in a gap between a ratchet tooth 311 and another adjacent ratchet tooth 311, the electromagnet 33 is attracted into the gap between the ratchet tooth 311 and the another adjacent ratchet tooth 311.

In this way, as the scroll wheel 20 scrolls, the electromagnet 33 can move into and move out of the gap between the ratchet teeth 311 of the metal inner ratchet 31, so that when the scroll wheel 20 is scrolled, a hand feel of continuous ratcheting or continuous paragraphs is generated. When accurate scrolling is needed, the user can be provided with a specific spinning hand feel when scrolling the scroll wheel 20.

In addition, alternatively, a rotational speed value range may be specified and input into the control element 34 in advance, so that when a spinning speed of the scroll wheel 20 falls within the rotational speed value range input into the control element 34 in advance, the control element 34 provides the electric power to the electromagnet 33, and the electromagnet 33 generates the magnetic field. When the spinning speed of the scroll wheel 20 is greater than or less than the rotational speed value range input into the control element 34 in advance, the control element 34 provides no electric power to the electromagnet 33.

Therefore, when the spinning speed of the scroll wheel 20 is greater than or less than the rotational speed value range in the control element 34, the electromagnet 33 is not driven by the control element 34. Therefore, the electromagnet 33 neither comes into contact with the ratchet teeth 311 of the metal inner ratchet 31, nor engages with the ratchet teeth 311 of the metal inner ratchet 31. In this way, when the scroll wheel 20 is scrolled, a free-spinning scroll effect can be achieved, and the mouse 100 can switch between a ratcheting scroll mode and a free-spinning scroll mode according to different spinning speeds of the scroll wheel 20.

In addition, the central axes of the scroll wheel 20, the mounting area 21, the metal inner ratchet 31, the connecting shaft 17, and the encoding element 18 are the same central axis. Therefore, when the scroll wheel 20 is scrolled, no misalignment occurs, increasing the service life of the mouse 100.

In addition, the metal inner ratchet 31 is mounted in the mounting area 21 of the scroll wheel 20. Therefore, spinning inertia can be increased when the scroll wheel 20 is scrolled, prolonging scrolling time of the scroll wheel 20.

It can be learned from the foregoing descriptions that, first, the electromagnetic module 30 is disposed, so that when the scroll wheel 20 is scrolled, an effect of continuous-ratcheting can be achieved; second, a rotational speed value range is specified in the control element 34 in advance, so that when the spinning speed of the scroll wheel 20 is greater than or less than values in the rotational speed value range, the scroll wheel 20 can achieve the free-spinning scroll effect; third, the central axes of the scroll wheel 20, the mounting area 21, the metal inner ratchet 31, the connecting shaft 17, and the encoding element 18 are the same central axis, so that when the scroll wheel 20 is scrolled, no misalignment occurs, increasing the service life of the mouse 100; and fourth, the metal inner ratchet 31 is mounted in the mounting area 21, so that the scrolling time of the scroll wheel 20 is prolonged.

The foregoing descriptions are only preferred embodiments of the present invention, and are not used to limit the claims of the present invention. Therefore, any other equivalent variations and modifications without departing from the spirit disclosed in the present invention should fall within the claims of this application.

What is claimed is:
1. A mouse with an electromagnetic module, comprising:
   a mouse body;
   a scroll wheel, mounted in the mouse body, a side of the scroll wheel being provided with a mounting area; and
   an electromagnetic module, mounted in the mouse body, the electromagnetic module comprising:
   a metal inner ratchet, mounted and fastened in the mounting area;
   a connecting piece, located on the side of the scroll wheel on which the mounting area is provided, the connecting piece comprising a connecting section and a free section, the connecting section being connected to the mouse body, and the free section passing through the mounting area;
   an electromagnet, mounted on the free section and arranged corresponding to the metal inner ratchet; and
   a control element, electrically connected to the electromagnet, wherein the control element drives the electromagnet to generate a magnetic field, so that the electromagnet generates a magnetic attraction force to the metal inner ratchet, and the electromagnet and the metal inner ratchet can engage with each other,
   wherein the mouse body further comprises: an upper casing, a lower casing and a pair of supports, the upper casing correspondingly covers the lower casing and an accommodating space is formed between the upper casing and the lower casing, the scroll wheel, the electromagnetic module and the pair of supports are mounted in the accommodating space, the bottom of each of the pair of supports is fastened to the lower casing, and the scroll wheel is located between the pair of supports and two sides of the scroll wheel are respectively pivotally connected to the supports,
   wherein the connecting section is connected to the support located on the side of the scroll wheel on which the mounting area is provided, and the free section extends out of the connecting section,
   wherein the mouse body further comprises a connecting shaft, and the connecting shaft passes through and is connected to the scroll wheel and two sides of the connecting shaft are respectively pivotally connected to the supports, so that the scroll wheel is pivotally connected to the pair of supports by using the connecting shaft,
   wherein the mouse body further comprises an encoding element, the electromagnetic module further comprises a rotational speed sensing element, the encoding element is located on a side of the scroll wheel away from the mounting area, the encoding element is connected to the connecting shaft, and the rotational speed sensing element is mounted below the encoding element and is electrically connected to the control element.

2. The mouse with an electromagnetic module according to claim 1, wherein the electromagnetic module further comprises a pair of magnetic elements, the pair of magnetic elements are respectively mounted on two sides of the encoding element and are arranged in a symmetric layout, and the rotational speed sensing element can detect positions of the pair of magnetic elements rotating with the encoding element, to generate a rotational speed signal.

3. The mouse with an electromagnetic module according to claim 2, wherein the rotational speed sensing element is a Hall effect sensor, the magnetic element is a magnet, the control element is a microcontroller, and the encoding element is an encoder.

4. The mouse with an electromagnetic module according to claim 2, wherein the mouse body further comprises a main circuit board, the main circuit board is mounted to the lower casing and is located in the accommodating space, and the control element and the rotational speed sensing element are both mounted on the main circuit board and are electrically connected to the main circuit board.

5. The mouse with an electromagnetic module according to claim 4, wherein the connecting piece is a circuit board, the connecting piece is electrically connected to the main circuit board, and the electromagnet is electrically connected to the connecting piece, so that the electromagnet is electrically connected to the control element by using the connecting piece and the main circuit board.

6. The mouse with an electromagnetic module according to claim 5, wherein central axes of the scroll wheel, the mounting area, the metal inner ratchet, the connecting shaft, and the encoding element are a same central axis.

7. The mouse with an electromagnetic module according to claim 1, wherein the metal inner ratchet is an element made of a metal material containing a magnetic substance such as iron, cobalt, or nickel.

\* \* \* \* \*